US008793288B2

(12) United States Patent
Hempelmann et al.

(10) Patent No.: US 8,793,288 B2
(45) Date of Patent: Jul. 29, 2014

(54) ONLINE ACCESS TO DATABASE SNAPSHOTS

(75) Inventors: Henrik Hempelmann, Havelberg (DE); Torsten Strahl, Kleinmachnow (DE)

(73) Assignee: SAP AG, Walldorf (DE)

( * ) Notice: Subject to any disclaimer, the term of this patent is extended or adjusted under 35 U.S.C. 154(b) by 539 days.

(21) Appl. No.: 12/639,391

(22) Filed: Dec. 16, 2009

(65) Prior Publication Data

US 2011/0145186 A1 Jun. 16, 2011

(51) Int. Cl.
*G06F 7/00* (2006.01)
*G06F 17/30* (2006.01)

(52) U.S. Cl.
USPC ............ 707/812; 707/802; 707/690; 707/693

(58) Field of Classification Search
None
See application file for complete search history.

(56) References Cited

U.S. PATENT DOCUMENTS

| | | | |
|---|---|---|---|
| 5,369,757 A | 11/1994 | Spiro et al. | |
| 5,649,152 A | 7/1997 | Ohran et al. | |
| 5,826,259 A * | 10/1998 | Doktor | 707/999.001 |
| 5,835,953 A | 11/1998 | Ohran | |
| 5,918,229 A | 6/1999 | Davis et al. | |
| 5,956,731 A | 9/1999 | Bamford et al. | |
| 6,073,222 A | 6/2000 | Ohran | |
| 6,105,030 A | 8/2000 | Syed et al. | |
| 6,240,527 B1 | 5/2001 | Schneider et al. | |
| 6,314,566 B1 * | 11/2001 | Arrouye et al. | 717/148 |
| 6,353,837 B1 | 3/2002 | Blumenau | |
| 6,658,417 B1 | 12/2003 | Stakutis et al. | |
| 6,665,815 B1 | 12/2003 | Goldstein et al. | |
| 6,742,028 B1 | 5/2004 | Wang et al. | |
| 6,745,344 B1 | 6/2004 | Joshi et al. | |
| 6,763,423 B2 | 7/2004 | Stakutis et al. | |
| 6,973,455 B1 | 12/2005 | Vahalia et al. | |
| 7,133,884 B1 | 11/2006 | Murley et al. | |
| 7,162,498 B2 | 1/2007 | Nomoto et al. | |
| 7,181,476 B2 | 2/2007 | Lee et al. | |
| 7,225,208 B2 | 5/2007 | Midgley et al. | |
| 7,440,979 B2 | 10/2008 | Strahl et al. | |
| 2004/0139128 A1 | 7/2004 | Becker et al. | |
| 2004/0267828 A1 | 12/2004 | Zwilling et al. | |
| 2004/0267835 A1 | 12/2004 | Zwilling et al. | |
| 2004/0268068 A1 | 12/2004 | Curran et al. | |
| 2005/0216462 A1 | 9/2005 | Xiao | |
| 2005/0262103 A1 | 11/2005 | Stakutis et al. | |
| 2006/0112151 A1 | 5/2006 | Manley et al. | |

(Continued)

FOREIGN PATENT DOCUMENTS

EP 1 788 496 A2 5/2007

OTHER PUBLICATIONS

"European Search Report", dated Oct. 19, 2011, for European Application No. 10014111.8 - 2201 / 2336901, 7 pgs.

*Primary Examiner* — Fred I Ehichioya
*Assistant Examiner* — Jau-Shya Meng
(74) *Attorney, Agent, or Firm* — Buckley, Maschoff & Talwalkar LLC

(57) ABSTRACT

An executing database instance includes a first plurality of database pages associated with a previous state of the database instance, a cache storing a current converter of the executing database instance, the current converter not representing the first plurality of database pages, and a database management system. The database management system is to receive a request for access to the first plurality of database pages, and perform a database task using one or more of the first plurality of database pages while the database instance is executing.

11 Claims, 13 Drawing Sheets

(56) References Cited

U.S. PATENT DOCUMENTS

| | | |
|---|---|---|
| 2006/0200500 A1* | 9/2006 | Baek et al. .................... 707/202 |
| 2006/0230079 A1 | 10/2006 | Strahl et al. |
| 2007/0022146 A1 | 1/2007 | Murley et al. |
| 2007/0050381 A1 | 3/2007 | Hu et al. |
| 2007/0185881 A1 | 8/2007 | Vienneau et al. |
| 2007/0226270 A1 | 9/2007 | Sarma et al. |
| 2008/0189498 A1* | 8/2008 | Brown ......................... 711/162 |
| 2008/0217393 A1 | 9/2008 | Hempelmann et al. |
| 2009/0070330 A1 | 3/2009 | Hwang et al. |
| 2009/0089307 A1 | 4/2009 | Strahl et al. |
| 2009/0254774 A1* | 10/2009 | Chamdani et al. ................ 707/5 |

\* cited by examiner

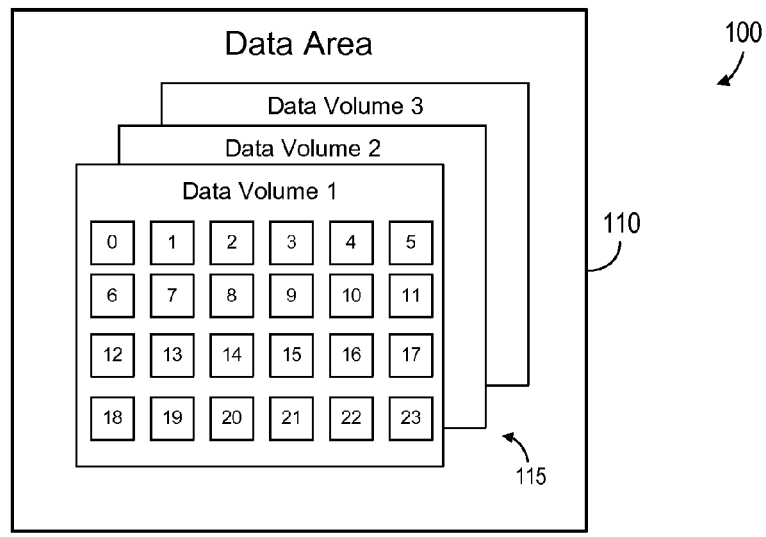
FIG. 10
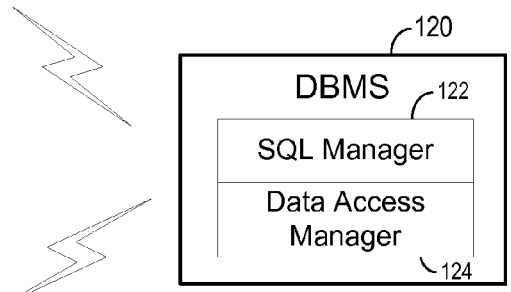
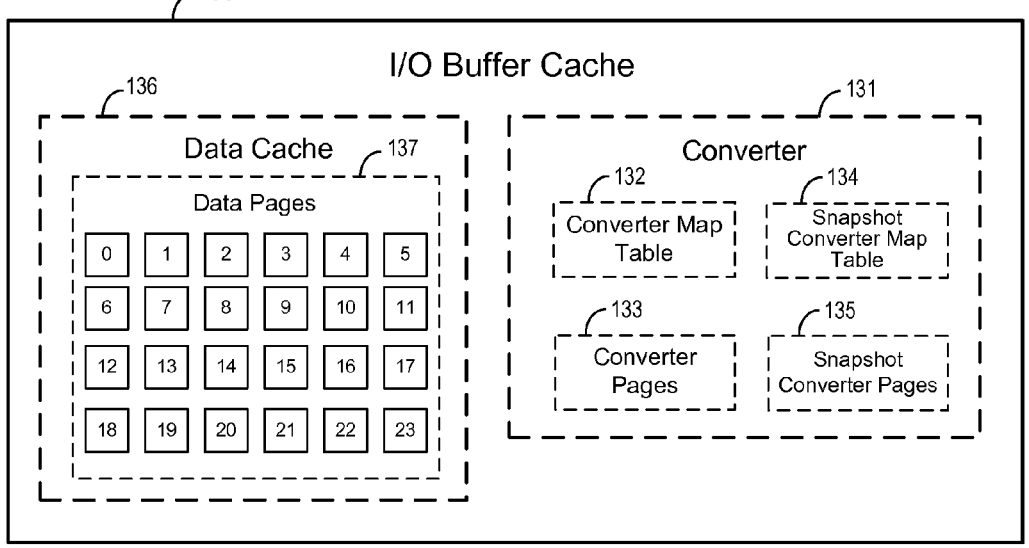

1200

| File ID | Page No. |
|---|---|
| dj89wejh | 43 |
| 90utjf24 | 567 |
| asd34511 | 15667 |
| e12308uf | 4321 |

| File ID | Page No. |
|---|---|
| dj89wejh | 43 |
| 90utjf24 | 567 |
| asd34511 | 15667 |
| e12308uf | 4321 |
| 1:dj89wejh | 1:43 |
| 1:90utjf24 | 1:567 |
| 1:asd34511 | 1:15667 |
| 1:e12308uf | 1:4321 |

*FIG. 12b*

| File ID | Object Name | Columns | Data Types | Permissions | Indices |
|---|---|---|---|---|---|
| dj89wejh | ~~~~~ | ~~~~~ | ~~~~~ | ~~~~~ | ~~~~~ |
| 90utjf24 | ~~~~~ | ~~~~~ | ~~~~~ | ~~~~~ | ~~~~~ |
| asd34511 | ~~~~~ | ~~~~~ | ~~~~~ | ~~~~~ | ~~~~~ |
| e12308uf | ~~~~~ | ~~~~~ | ~~~~~ | ~~~~~ | ~~~~~ |

| File ID | Object Name | Columns | Data Types | Permissions | Indices |
|---|---|---|---|---|---|
| dj89wejh | ~~~~~ | ~~~~~ | ~~~~~ | ~~~~~ | ~~~~~ |
| 90utjf24 | ~~~~~ | ~~~~~ | ~~~~~ | ~~~~~ | ~~~~~ |
| asd34511 | ~~~~~ | ~~~~~ | ~~~~~ | ~~~~~ | ~~~~~ |
| e12308uf | ~~~~~ | ~~~~~ | ~~~~~ | ~~~~~ | ~~~~~ |
| 1:dj89wejh | ~~~~~ | ~~~~~ | ~~~~~ | ~~~~~ | ~~~~~ |
| 1:90utjf24 | ~~~~~ | ~~~~~ | ~~~~~ | ~~~~~ | ~~~~~ |
| 1:asd34511 | ~~~~~ | ~~~~~ | ~~~~~ | ~~~~~ | ~~~~~ |
| 1:e12308uf | ~~~~~ | ~~~~~ | ~~~~~ | ~~~~~ | ~~~~~ |

ONLINE ACCESS TO DATABASE SNAPSHOTS

FIELD

Some embodiments relate to database systems. In particular, some embodiments concern systems for accessing a previous state of a database system.

BACKGROUND

A database system requires periodic management tasks to ensure reliable and efficient operation. These management tasks may include integrity checks, calculation of optimizer statistics, indexing, etc.

A database management task operates on a set of database objects. Accordingly, changes to the database objects are prevented during operation of the management task. One method for preventing such changes is to deny client applications access to the database system during operation of the management task. This method may result in unacceptable levels of system downtime.

Alternatively, database objects may be locked prior to execution of a management task which will operate thereon. The database system may continue to respond to requests from client applications while the database objects remain locked. However, the locks may conflict with certain requests from the client applications. Moreover, the locks may negatively impact the performance of the database system.

It may be desirable to provide a system to allow operation of a database management task while addressing one or more of the foregoing concerns.

BRIEF DESCRIPTION OF THE DRAWINGS

FIG. 10 is a block diagram of an executing database instance according to some embodiments.

FIG. 12a illustrates a portion of a database file directory according to some embodiments.

FIG. 12b illustrates a portion of a database file directory including snapshot-specific file identifiers and page numbers according to some embodiments.

FIG. 13a illustrates a portion of a database catalog according to some embodiments.

FIG. 13b illustrates a portion of a database catalog including snapshot-specific file identifiers according to some embodiments.

DETAILED DESCRIPTION

Figure 1:
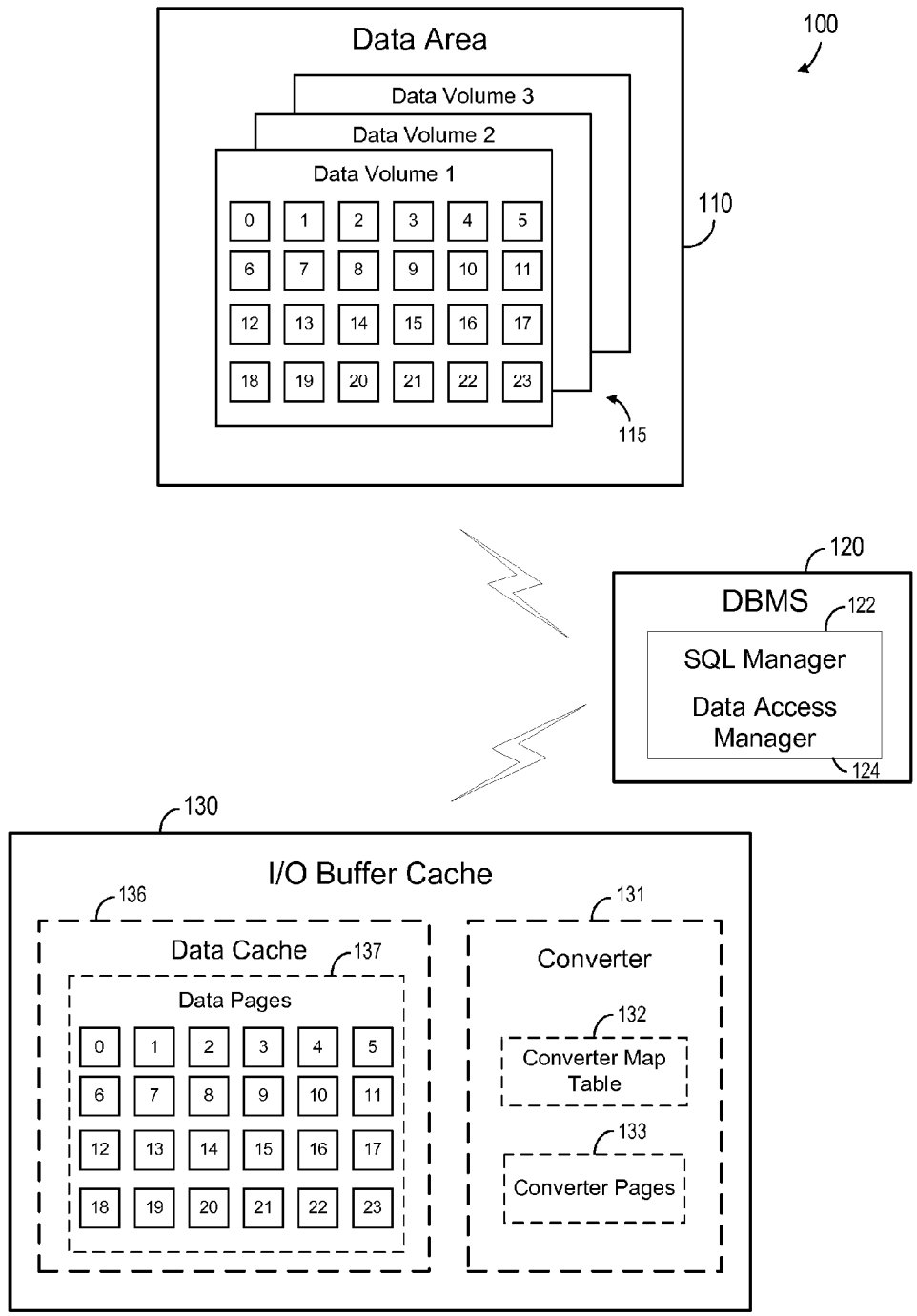
FIG. 1 is a block diagram of an executing database instance according to some embodiments.

FIG. 1 is a block diagram of executing database instance 100 according to some embodiments. An executing database instance, generally, includes at least one operating system process, a physical data storage unit and a block of cache memory (e.g., Random Access Memory). These components are represented in FIG. 1, respectively, by database management system (DBMS) 120, data area 110, and I/O buffer cache 130. The present description will use the terms "database" and "database instance" interchangeably.

Database instance 100 may also include other unshown elements that may be used during operation thereof, such as any suitable program code, scripts, or other functional data that is executable to interface with other elements, other applications, other data files, operating system files, and device drivers. These elements are known to those in the art, and are therefore not described in detail herein.

Database instance 100 may communicate with one or more database applications (not shown) over one or more interfaces provided by DBMS 120. The applications may provide business monitoring, inventory control, online shopping, and/or any other suitable functions. The applications may, in turn, support client applications that may be executed by client devices. Such a client application may simply comprise a Web browser to access and display reports generated by a database application.

Data area 110 may comprise one or more disparate physical systems for storing data. These physical systems may comprise a portion of a physical hard disk, an entire physical hard disk, or a storage system composed of several physical hard disks. Data area 110 may include application data consisting of database objects and associated index entries. The database objects may include tables, indexes, views, users and user groups.

Data area 110 may also include configuration files defining properties of database instance 100 (e.g., a size and physical location of each data volume, a maximum number of data volumes in data area 110, etc.). Moreover, data area 110 typically includes system files, converter pages, database parameters, paths, user information and any other suitable information. Data area 110 may also store a database catalog including metadata describing the database objects that are stored therein.

The data of data area 110 may be received from disparate hardware and software systems, some of which are not interoperational with one another. The systems may comprise a back-end data environment employed in a business or industrial context. The data may be pushed to database instance 100 and/or provided in response to queries received therefrom.

Data volumes 115 are subdivided into storage areas known as blocks. The data stored in data volumes 115 is stored in logical pages having the same size as a block. Accordingly, a particular page of data volumes 115 may be accessed by referencing a particular data volume and a block address of the particular data volume.

When a new page is created, the page is assigned a unique logical page number. Converter pages of data volumes 115 map this logical page number to the volume and block address at which the page is stored. A file directory maps a file identifier to a logical page number of a corresponding file root page, and the aforementioned database catalog maps each file identifier to associated metadata, including a name of a database object associated with the file identifier. Accordingly, the information of the database catalog and the file directory may be used to determine a logical page number from a name of a database object. Once the page number is known, the converter pages may be used to determine a block address at which a root page of the database object is stored.

Data area 110 may include more or fewer data volumes than illustrated in FIG. 1. Database instance 100 may also store log volumes in a log area (not shown). Such log volumes store information indicating changes made to stored data. The information may be used for returning database instance 100 to a consistent state after a system crash.

DBMS 120 may comprise any system for managing a database instance that is or becomes known. Generally, DBMS 120 may receive requests for data (e.g., Structured Query Language (SQL) requests from a database application), may retrieve the requested data from data area 110 or from I/O buffer cache 130, and may return the requested data to the requestor. DBMS 120 may also perform start-up, logging, recovery, management, optimization, monitoring, indexing, integrity checks and other database-related tasks. In some embodiments, DBMS 120 includes SQL manager 122 to process received SQL statements and data access manager 124 to manage access to stored data.

I/O buffer cache 130 stores various elements of data area 110 during execution of database instance 100. These elements may include recently-accessed pages of application data, converter pages, database catalog objects and/or a log queue. I/O buffer cache 130 is used to manage memory that is available for I/O operations.

I/O buffer cache 130 includes data cache 136 and converter 131. Data cache 136 and converter 131 are illustrated separately herein for the sake of clarity. According to some embodiments, data cache 136 and converter 131 might not comprise separate, contiguous memory addresses of I/O buffer cache 130. For example, converter pages 133 may be interspersed among data pages 137 throughout I/O buffer cache 130.

Generally, data cache 136 stores pages from data area 110 that have been recently read or write-accessed. If a database transaction requires modification of a page, the page is read from a block address of data volumes 115, the page is modified, and a log entry describing the modification is recorded. The modified page is stored in cache 136, the modified page is designated as modified, and the original "last known good" page remains at the block address of data volumes 115 from which it was read. Once a number of modified pages in cache 136 reaches a threshold amount, or after passage of a designated time interval, all pages of cache 136 which are designated as modified are written to data area 110.

A modified page is not written to the block address of data volumes 115 from which it was initially read. Rather, the original unmodified page remains designated as a "last known good" page at its block address and the modified page is written to a new block address of data volumes 115.

A savepoint is periodically initiated to convert the modified pages stored in data area 110 to "last known good" pages and to free the blocks used by the existing "last known good" pages so that pages may be written thereto. At a savepoint, all pages designated as modified in cache 136 are written to data area 110 as described above. Once all modified pages are written to data area 110, the "last known good" pages associated with the modified pages are released so that their associated block addresses may be overwritten.

As mentioned above, converter pages of data area 110 map logical page numbers to block addresses of data volumes 115. Accordingly, these converter pages must be modified once a corresponding data page is saved to a new location of data volumes 115. The modified converter pages are flushed to data volumes 115 at the end of a savepoint, particularly after all modified data pages are written. Then, a restart record is created to point to the starting point of the newly-saved converter within data volumes 115.

In case of a system crash, the modified pages stored in data area 110 are ignored and data area 110 is reconstructed based on the restart record, the converter pages identified from the restart record, the "last known good" pages (which are identified by the converter pages), and the log entries (which reflect page changes since the last savepoint).

U.S. Pat. No. 7,440,979, entitled Snapshots For Instant Backup In A Database Management System, describes a system in which, at some savepoints, the previous "last known good" pages are not freed for overwriting. Rather, these data pages are marked, tagged, or otherwise identified as being part of a snapshot. Accordingly, the pages will not be overwritten until a command to remove the snapshot is received. These snapshot pages include pages storing application data (e.g., database objects) as well as converter pages pointing thereto. A snapshot restart record pointing to the starting point of this converter is also created. Consequently, data area 110 may be reconstructed based on the snapshot restart record, the converter pages identified from the snapshot restart record, and the "last known good" data pages of the snapshot (which are identified by the converter pages).

Figure 2:
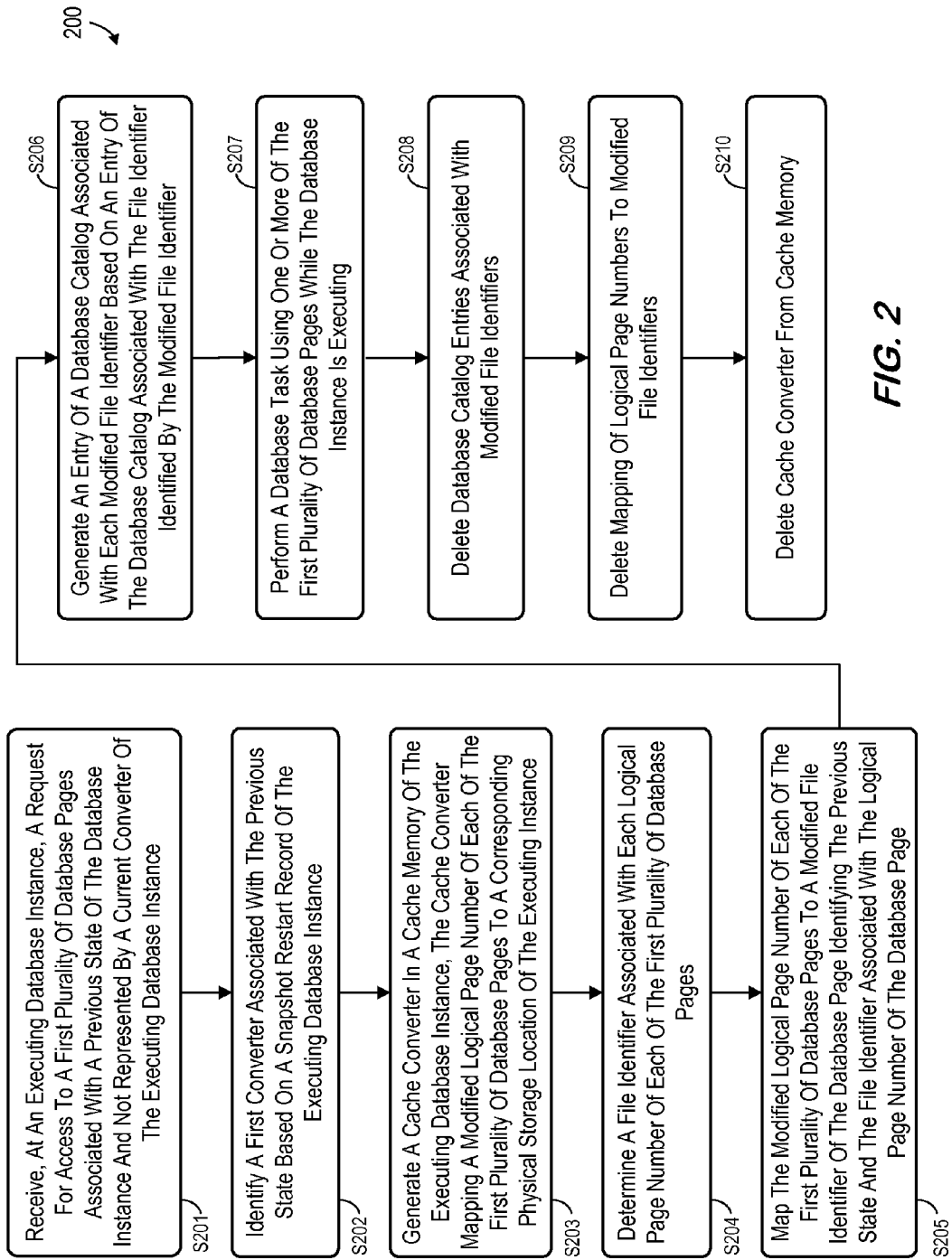
FIG. 2 comprises a flow diagram of a process according to some embodiments.

FIG. 2 is a flow diagram of process 200 according to some embodiments. Some embodiments of process 200 may provide access to pages of a database snapshot during execution of a database instance including the snapshot. In some embodiments, a hardware environment of database instance 100 executes program code of DBMS 120 to perform process 200. Process 200 may be performed in response to a command received from a database client (not shown), or may be initiated by a thread of DBMS 120.

Process 200 and all other processes mentioned herein may be embodied in processor-executable program code read from one or more of a computer-readable medium, such as a floppy disk, a CD-ROM, a DVD-ROM, a Zip™ disk, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

A database snapshot is created prior to process 200. The database snapshot includes a plurality of database pages stored in the data area of an executing database instance. The database pages, which include data pages and converter pages, are associated with a state of the database instance at the time the snapshot was created.

Figure 3:
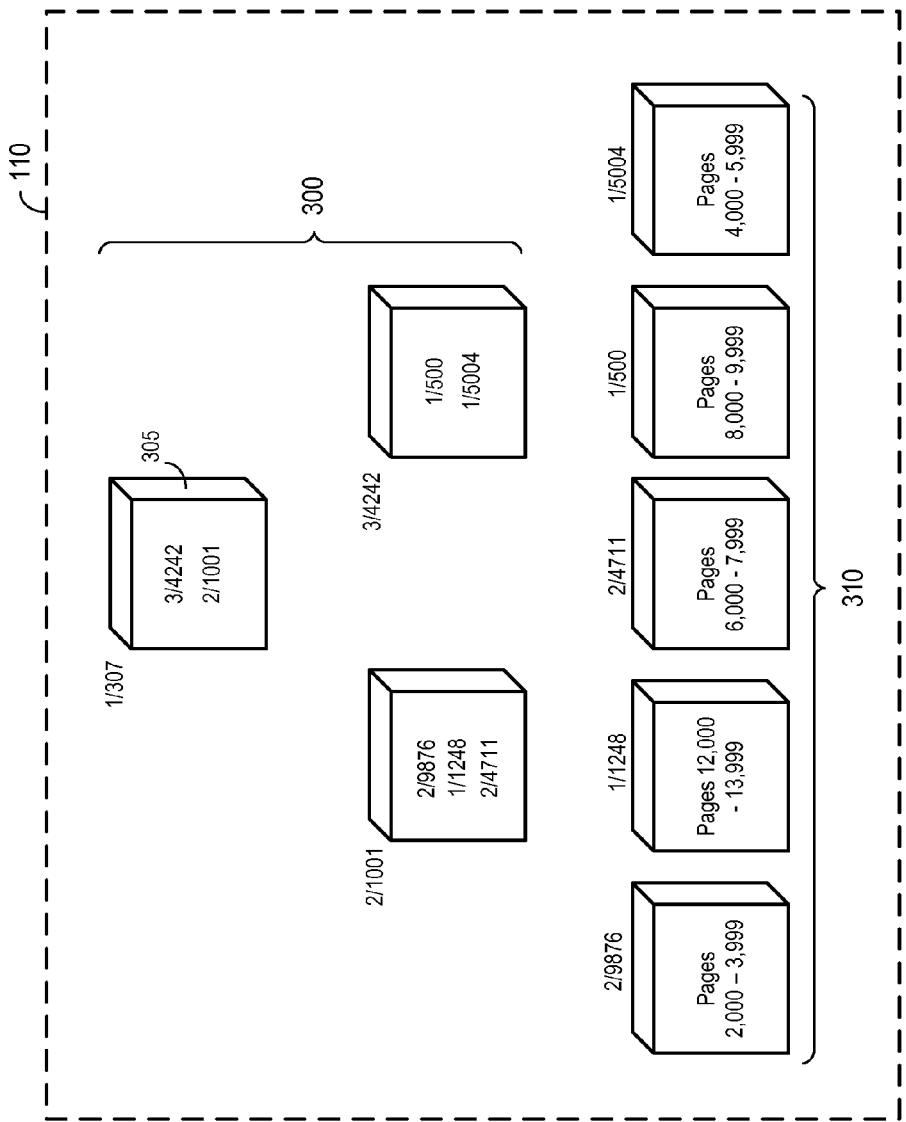
FIG. 3 illustrates a converter stored in a data area according to some embodiments.

To better convey the foregoing example of process 200 according to some embodiments, FIG. 3 shows converter index pages 300 and converter pages 310 of data area 110 after completion of a database snapshot taken prior to process 200. As at any other savepoint, all modified pages of I/O buffer cache 130 are saved to data area 110 at the time of the snapshot, marked as "last known good", and the previous "last known good" pages associated with the modified pages are released. The converter pages associated with the saved modified pages are then modified in cache 130, saved to new locations of data area 110, and marked as "last known good", with the previous "last known good" converter pages associated with the modified converter pages also being released. Finally, all "last known good" pages of data area 110 are identified as being part of a snapshot.

According to the present example, converter pages 310 of FIG. 3 represent the "last known good" converter pages which have been identified as being part of the snapshot. Index pages 300 may be used to locate a converter page 310 and to locate a data page in data area 110 based on the located converter page 310. Each index page 300 includes block addresses of one or more other index pages or of a converter page 310. By virtue of this arrangement, any of converter pages 310 (and any associated data pages) may be located in data area 110 based only on the block address of converter root page 305.

Figure 4:
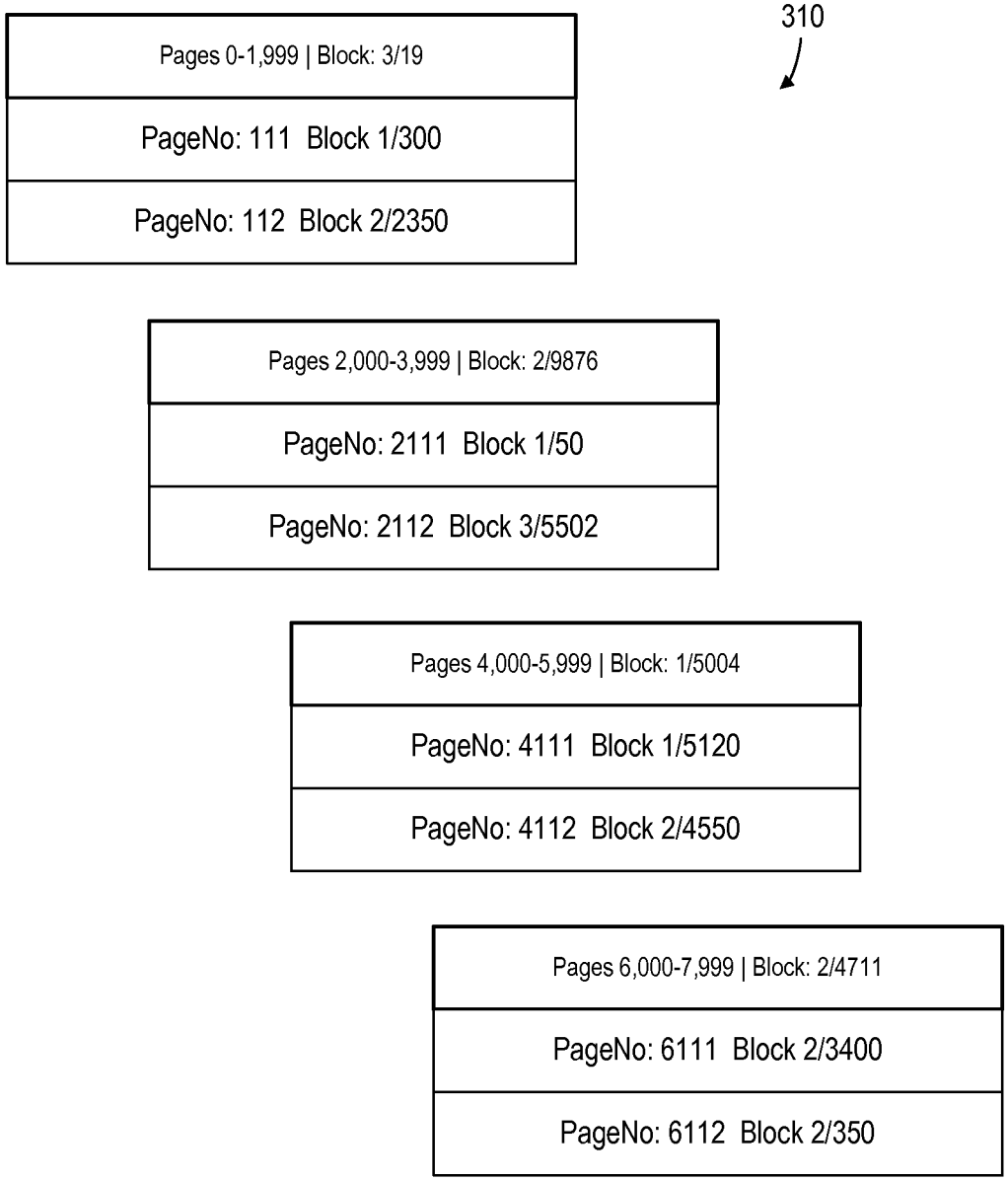
FIG. 4 illustrates portions of converter pages of a converter according to some embodiments.

FIG. 4 illustrates portions of some of converter pages 310 according to some embodiments. Each of converter pages 310 identifies a range of logical page numbers with which it is associated, and a block address at which it is stored. A converter page 310 also associates a block address with each data page having a logical page number in the range of the converter page 310.

A snapshot restart record is created to specify the block address of converter root page 305 of the snapshot. IOMan_InfoPage 500 of FIG. 5 includes rstVolumeId and rstBlockNo fields to identify a location of a current restart record 510. Current Restart_Record 510 includes member SnapInfoBA whose value references a location of Snapshot_Info page 520, which lists restart records of all snapshots of system 100. The snapshot restart record of a snapshot indicates the block address of that snapshot's converter root page. IOMan_InfoPage 500, current Restart_Record 510 and Snapshot_Info page 520 may include member values other than and in addition to those illustrated in FIG. 5.

Figure 5:
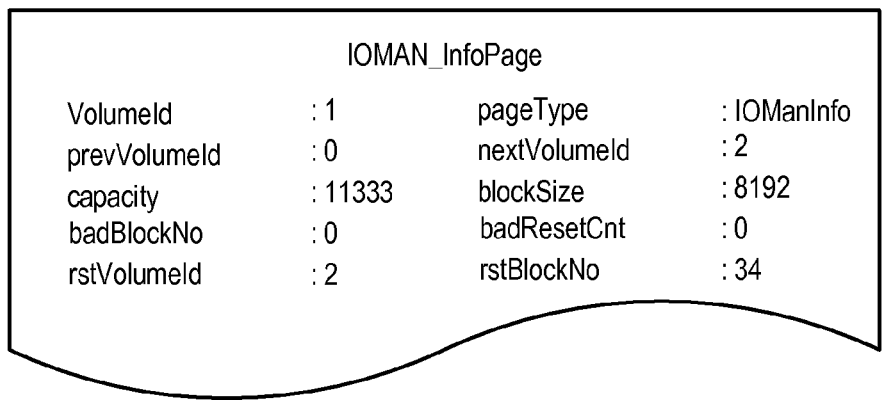
FIG. 5 illustrates an I/O management page of a database instance according to some embodiments.
Figure 5:
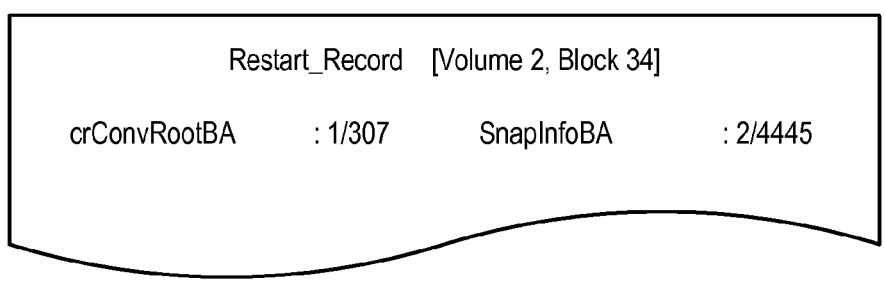
Figure 5:
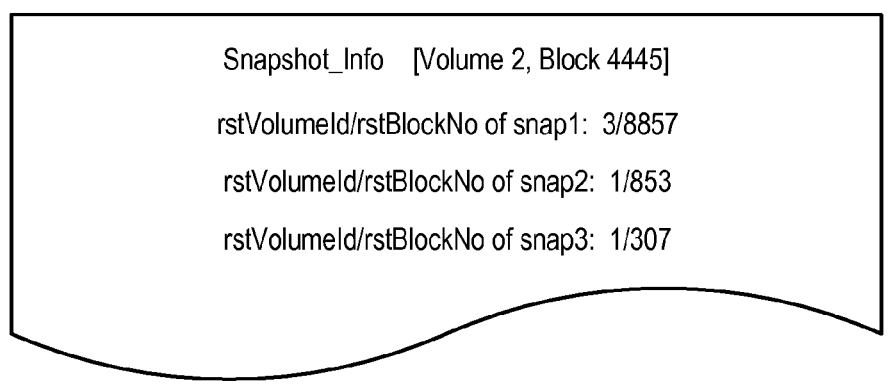

As shown in FIG. 5, the snapshot restart record of the just-created snapshot (i.e., snap3) is identical to "last known good" converter root page of the most-recent savepoint, which, at the time represented in the example, is the savepoint at which the snapshot was created.

Successive savepoints are created as time passes during execution of database instance 100. Each savepoint involves saving modified data pages and converter pages to data area 110 and releasing previous "last known good" pages for overwriting as described above. Accordingly, the "last known good" data pages and converter pages become more and more dissimilar from the "last known good" data pages and converter pages of the snapshot.

Figure 6:
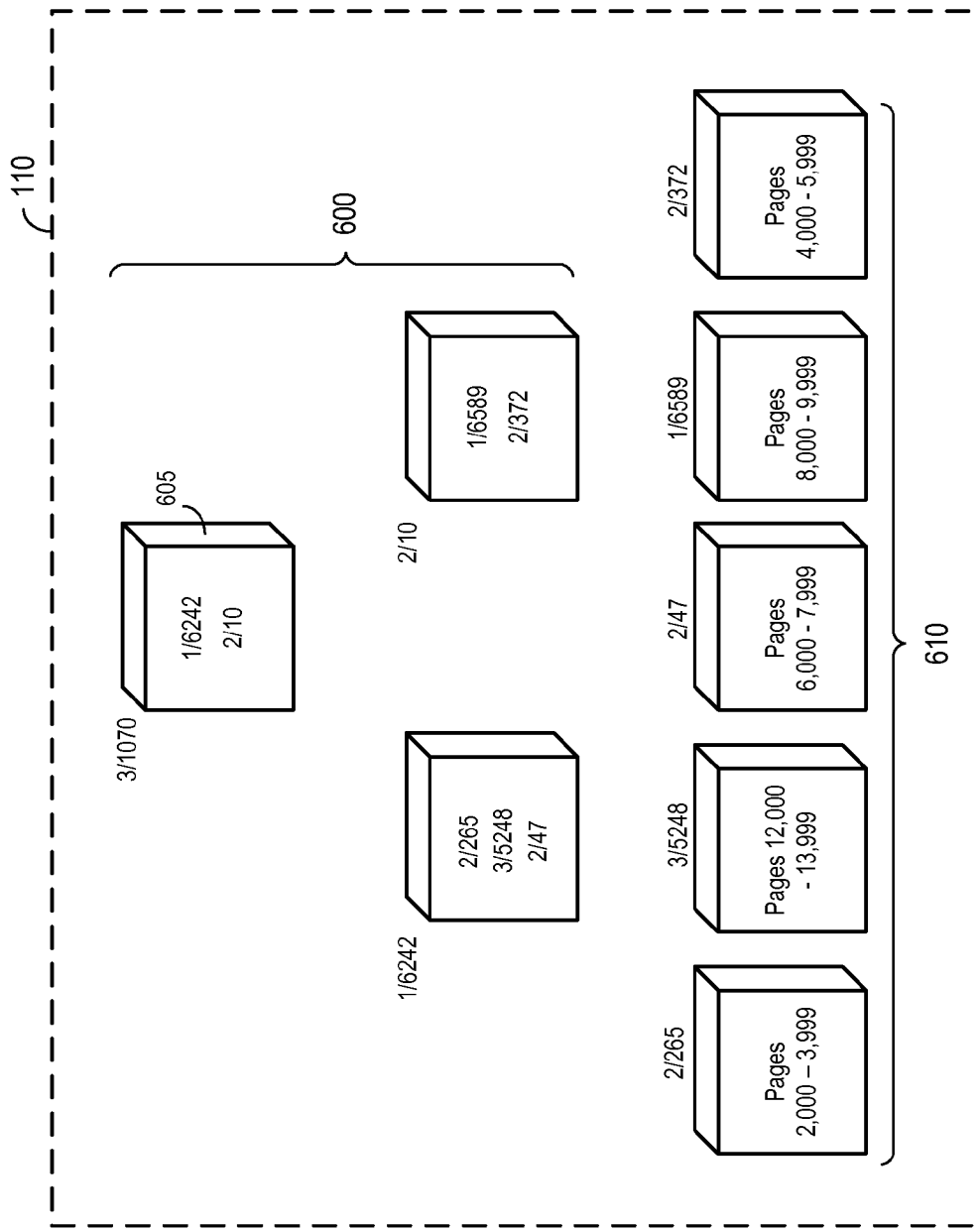
FIG. 6 illustrates a converter stored in a data area according to some embodiments.
Figure 7:
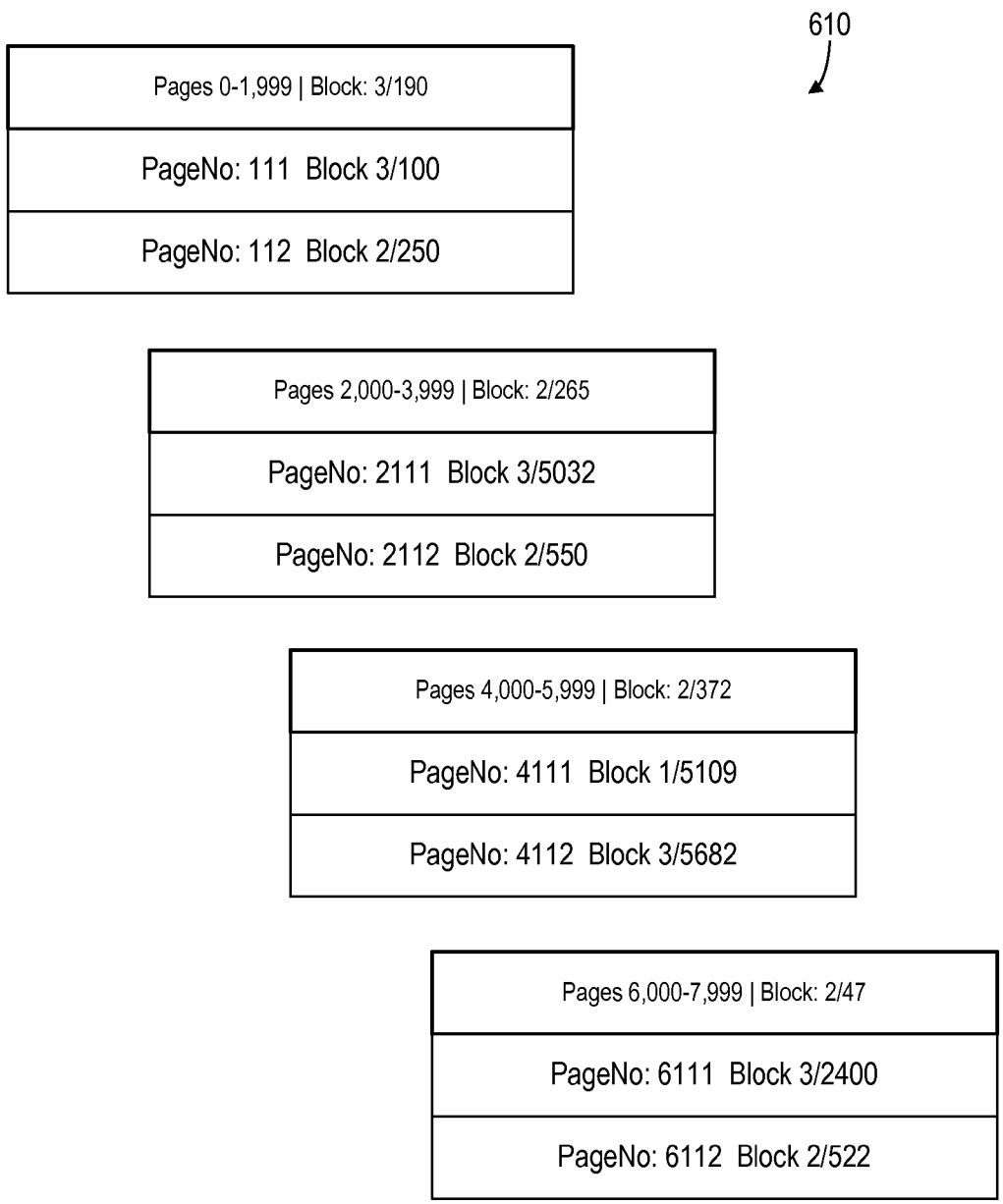
FIG. 7 illustrates portions of converter pages of a converter according to some embodiments.

FIG. 6 shows converter index pages 600 and converter pages 610 of data area 110 after the creation of the above-described database snapshot, after the occurrence of several subsequent savepoints, and at the commencement of process 200. FIG. 7 illustrates portions of some of converter pages 610 according to some embodiments. Converter index pages 600 and converter pages 610 represent the "last known good" converter pages created at a most-recent savepoint. The locations and the content of index pages 600 and converter pages 610 have changed in comparison to those shown in FIGS. 3 and 4.

Figure 8:
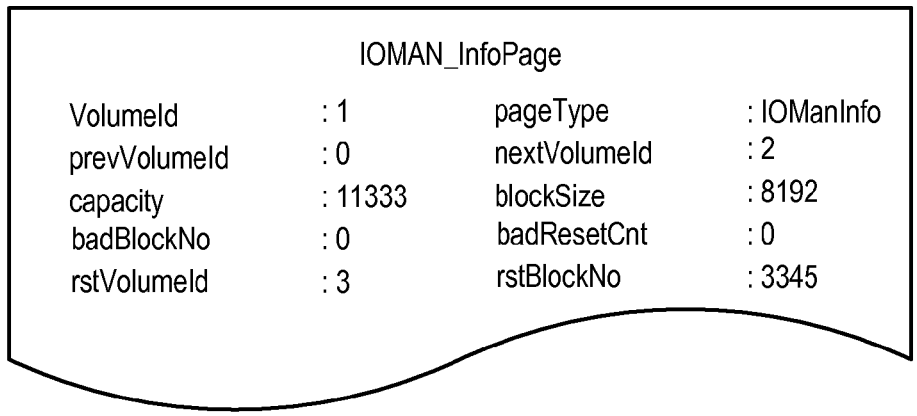
FIG. 8 illustrates an I/O management page of a database instance according to some embodiments.
Figure 8:
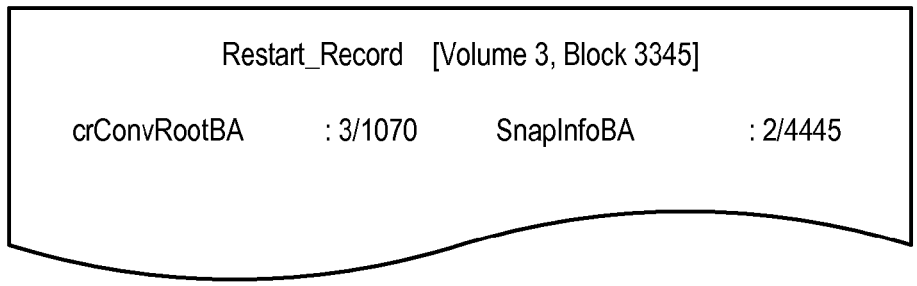
Figure 8:
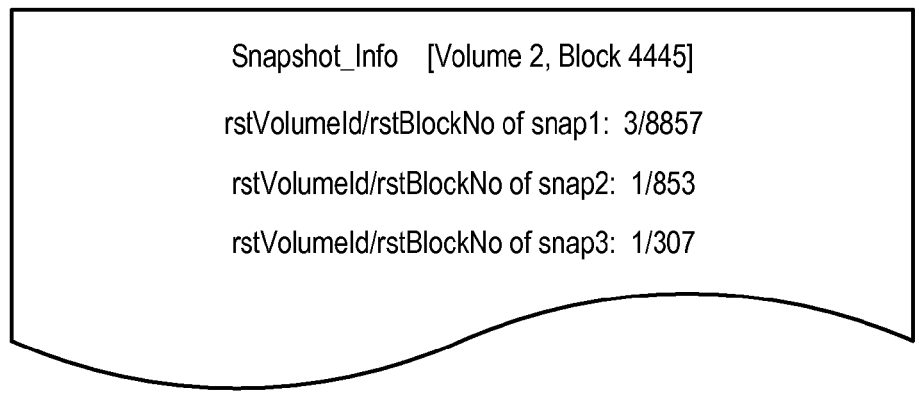

FIG. 8 illustrates IOMan_Info page 800 at the commencement of process 200. Due to the above-described intervening savepoints, rstVolumeId and rstBlockNo fields have changed to identify a location of new Restart_Record 810, which identifies a location of current converter root page 605 of FIG. 6. Since no snapshots were taken since the previously-described snapshot (i.e., snap3), Snapshot_Info page 520 remains unchanged and at block address 2/4445 as shown in FIG. 8.

Figure 9:
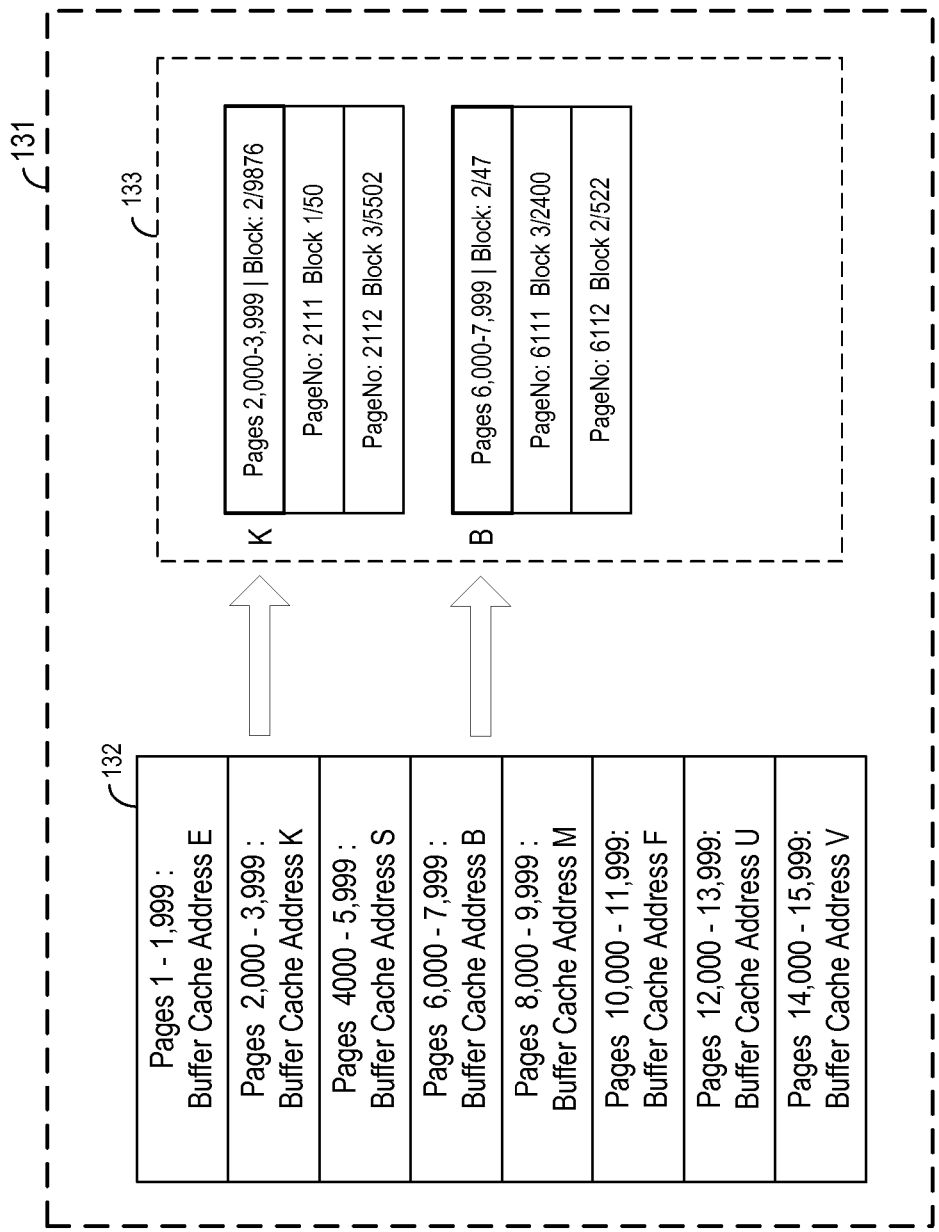
FIG. 9 illustrates elements of a converter in a cache according to some embodiments.

FIG. 9 illustrates tabular representations of converter map table 132 and converter pages 133 within I/O buffer cache 130 at the commencement of process 200 according to some embodiments. At this point, cache 130 may store modified versions of any of pages 600 and 610, as well as of any data pages, which were marked "last known good" at the most-recent savepoint.

Converter 131 is used during execution of database instance 100 to provide background for the forthcoming description. In this regard, converter 131 provides a runtime association between logical page numbers and physical block addresses of data volumes 115. For a given page number, converter 131 indicates a block address (e.g., a data volume number and an offset) at which an associated page is stored in data volumes 115. In a case that DBMS 120 cannot find a page in data cache 136, converter 131 is accessed to determine a location of the page in data volumes 115 based on the page's number.

As shown in FIG. 9, converter map table 132 of converter 131 specifies several ranges of logical page numbers. Converter map table 132 associates a memory address of I/O buffer cache 130 with each specified range. As also shown, stored at each memory address is a converter page 133 that lists page numbers in the range associated with each address. In the present example, converter pages 133 include copies of converter pages 610 of FIGS. 6 and 7.

Process 200 will now be described in view of the preceding description of the state of database instance 100 at the commencement of process 200. Embodiments, however, are not limited to any aspect of the preceding description.

A request is initially received by an executing database instance at S201. The request is a request for access to a first plurality of database pages associated with a previous state of the database instance. The first plurality of database pages are not represented by a current converter of the executing database instance.

For example, the first plurality of database pages may comprise pages of the above-described snapshot which have been modified since the time of the snapshot. Such pages, by virtue of the above-described mechanisms, will not be represented by a current converter 131 of the executing database instance. More particularly, current converter 131 will not associate logical page numbers of the first plurality of database pages with the locations of the pages at the time of the snapshot (i.e., as indicated by pages 300 and 310 of FIGS. 3 and 4).

The request may be received from any client application and/or internal process (e.g., a maintenance task). According to some embodiments, the request may comprise a request to refresh optimizer statistics based on the snapshot, to perform an integrity check based on the snapshot, or to compare data of the snapshot with current data. The request may have any other suitable purpose that is or becomes known.

At S202, a first converter associated with the previous state is identified. The identification may be based on a snapshot restart record of the executing database instance. IOMan_Info page 500 of FIG. 8 includes a snapshot restart record indicating that a root page of a converter associated with the snapshot is located at volume 1, block 307. As described above, the entire snapshot converter (i.e., pages 300 and 310) is identified at S202 based on the location of the root page.

A cache converter is generated in a cache memory of the executing database instance at S203. The cache converter maps a modified logical page number of each of the first plurality of database pages to a corresponding physical storage location of the executing database instance.

FIG. 10 illustrates database instance 100 after S203 according to some embodiments. Converter 131 includes converter map table 132 and converter pages 133 as illustrated in FIG. 9 and discussed above. However, converter 131 also includes snapshot converter map table 134 and snapshot converter pages 135. Snapshot converter map table 134 and snapshot converter pages 135 were generated at S203 to reflect converter pages 300 and 310 of the previous snapshot, which are still persisted in data volumes 115.

Snapshot converter map table 134 and snapshot converter pages 135 are generated at S203 based on the converter identified at S202. Accordingly, snapshot converter map table 134 and snapshot converter pages 135 map logical page numbers of the snapshot pages to physical locations of data area 110 as specified by converter pages 310 of FIGS. 3 and 4. However, these mappings identify previous stored versions of the data pages which associated with the logical page numbers, while converter pages 133 map the same logical page numbers to different locations of data area 110 which include the currently-persisted versions of the data pages. The logical page numbers of the previous stored versions of the data pages are therefore modified to indicate that these page numbers relate to pages of the database snapshot.

According to the present example, the modification includes prefacing the logical page numbers of the previous stored versions of the data pages with "1:". Any other system to distinguish the two exclusive sets of logical page numbers may be used in some embodiments. For example, in addition to the above-described modification, the logical page numbers of the currently-persisted versions of the data pages may be prefaced with "0:" within converter map table 132 and converter pages 133.

Figure 11:
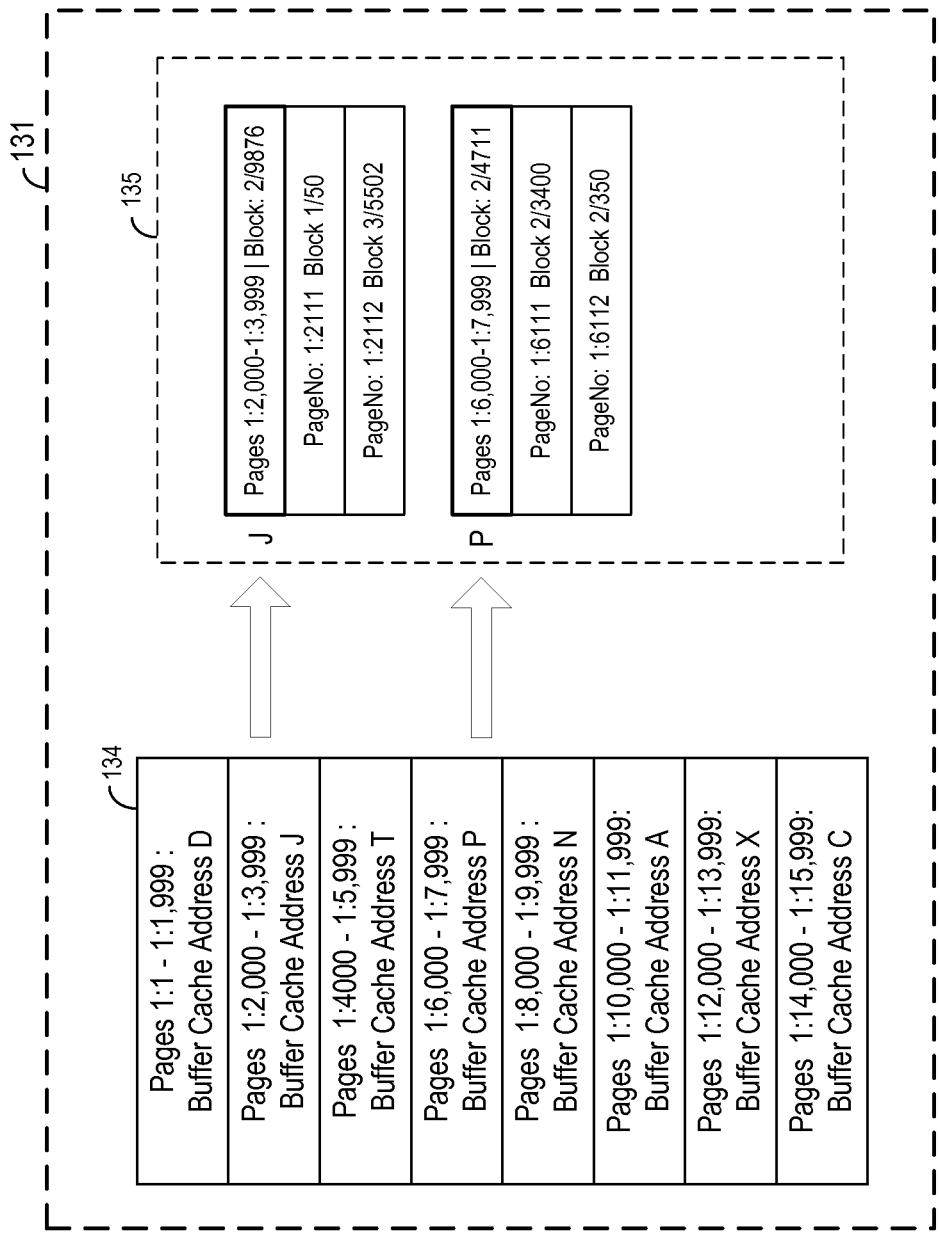
FIG. 11 illustrates elements of a converter in a cache according to some embodiments.

FIG. 11 illustrates snapshot converter map table 134 and snapshot converter pages 135 within converter 131 according to the present example. Each logical page number shown in FIG. 11 is prefaced with "1:". As described with respect to FIG. 9, snapshot converter map table 134 associates a memory address of I/O buffer cache 130 with each of several ranges of modified logical page numbers. Notably, these memory addresses are different from those shown in FIG. 9 for the identical ranges of logical page numbers. As also shown, stored at each memory address is a converter page 135 that lists the modified logical page numbers in the range associated with each address. In the present example, converter pages 135 include copies of converter pages 310 of FIGS. 3 and 4, albeit with modifications to their logical page numbers.

Snapshot converter map table 134 and snapshot converter pages 135 provide a runtime association between the modified logical page numbers of the database snapshot and physical block addresses of data volumes 115 in which corresponding pages are stored. In order to access these pages, a mapping is created between file identifiers and the modified logical page numbers.

In particular, file identifiers associated with the logical page number of each page of the database snapshot are determined at S204. The file identifiers may be determined by accessing an existing mapping of file identifiers to logical page numbers. As shown in FIG. 12a, file directory 1200 of database instance 110 associates file identifiers with logical page numbers. File directory 1200 may be implemented as a system table FILES which provides, for each internal database object, a file identifier and a logical page number of the file root.

File identifiers may be determined from file directory 1200 at S204 based on the (unmodified) logical page numbers associated with the pages of the database snapshot. For example, if converter pages 310 of the database snapshot include page number "567", the file identifier "90utjf24" is identified from file directory 1200 of FIG. 12a at S204.

Next, at S205, the modified logical page numbers of the snapshot pages are mapped to a modified file identifier. The modified file identifiers identify the snapshot and are based on the file identifiers determined at S204. According to the present example, the modification of the file identifiers includes prefacing the previously-determined file identifiers with "1:". FIG. 12b illustrates a portion of file directory 1200 including the mappings created at S205. As shown, each modified logical page number is mapped to a modified file identifier. Moreover, these mappings also maintain an easily-decipherable correspondence between a currently-stored page and its snapshot version.

Database catalog entries associated with each modified file identifier are generated at S206. This generation is based on existing entries of the database catalog which are associated with the file identifier identified by each respective modified file identifier.

FIG. 13a is a tabular representation of a portion of database catalog 1300 of database instance 100 according to some embodiments. Database catalog 1300 associates each of the file identifiers of FIG. 12a with an object name and other metadata. Database catalog 1300 may be stored in data volumes 115 and may include all or any subset of object metadata associated with the file identifiers.

A new entry is created in catalog 1300 at S206 for each file identifier of FIG. 13a for which a corresponding modified file identifier exists in file directory 1200. Resulting catalog 1300 is shown in FIG. 13b. To avoid duplicate object names, the object names associated with the modified file identifiers may also be modified (e.g., prefaced by "1").

While the database instance is executing, a database task is then performed at S207 using one or more of the plurality of database pages of the snapshot. The one or more of the plurality of database pages of the snapshot, as well as any current pages of the database instance, may be accessed via an associated name or file identifier through standard mechanisms of database instance 100.

Any suitable database task may be performed at S207, including but not limited to integrity checks, calculation of optimizer statistics, and indexing. The database task may comprise error-resolution according to some embodiments. For example, if the executing database instance issues an error (e.g., data corrupted), the data pages of the snapshot may be used to resolve the error (e.g., repair the corrupted data based on the snapshot data pages). Conversely, if a database task executed at S207 results in an error, current pages of the executing database instance may be accessed to attempt to resolve the error. If either type of resolution is unsuccessful, an administrator may be prompted for intervention.

According to some embodiments, S207 comprises creating a data backup based on the snapshot. The data backup may be stored external to database system 100. Moreover, creation of the data backup may include checking the snapshot for broken data structures and missing data pages, and resolving any detected errors prior to storing the now-verified data backup.

If needed to complete the task, all database objects of the snapshot may be identified via object names (or file identifiers) which include the prefix "1:". A database object of the snapshot which corresponds to a current database object may be identified by adding "1:" to the file identifier of the current database object. Similarly, a current database object which corresponds to a database object of the snapshot may be identified by removing "1:" from the file identifier of the current database object of the snapshot.

After completion of the database task, the database catalog entries generated at S206 may be deleted at S208. Next, at S209, the mappings between logical page numbers and modified file identifiers (e.g., in file directory 1200) are deleted. Lastly, the cache converter generated at S203 (e.g., table 134 and pages 135) is deleted at S210. As a result, database instance 110 returns to the state illustrated in FIGS. 1, 12a and 13a. Process 200 may then be re-executed during execution of the database instance to access data pages of the previously-accessed snapshot or to access data pages of any other snapshot that may be maintained in data volumes 115.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

The embodiments described herein are solely for the purpose of illustration. Those in the art will recognize other embodiments which may be practiced with modifications and alterations.

What is claimed is:

1. A method comprising:
   receiving, by a processor at an executing database instance, a request for access to a first plurality of database pages associated with a previous state of the database instance and not represented by a current converter of the executing database instance, the current converter mapping a logical page number of each database page associated with a current state of the executing database instance to a corresponding physical storage location, the first plurality of database pages including a first converter mapping a logical page number of each of the first plurality of database pages to a corresponding physical storage location, and the logical page numbers of the first plurality of database pages and at least one of the logical page numbers of the database pages associated with the current state of the executing database instance being the same;
   generating a cache converter in a cache memory of the executing database instance based on the first converter, the cache converter mapping a modified logical page number of each of the first plurality of database pages to a corresponding physical storage location, the modified logical page number of each of the first plurality of database pages identifying the previous state of the database instance and the logical page number of the database page;
   identifying a file identifier associated with each logical page number of each of the first plurality of database pages;
   mapping a modified file identifier of each of the first plurality of database pages to the modified logical page number of the database page, the modified file identifier identifying the previous state of the database instance and the file identifier associated with the logical page number of the database page;
   generating an entry of a database catalog to associate with each modified file identifier, the generated entry being based on an existing entry of the database catalog associated with the file identifier identified by the modified file identifier; and
   performing a database task using the mapping of modified file identifiers to modified logical page numbers and one or more of the first plurality of database pages while the database instance is executing.

2. The method according to claim 1, further comprising:
   identifying the first converter within the plurality of pages based on a snapshot restart record of the executing database instance.

3. The method according to claim 1, wherein performing the database task comprises performing a data integrity check based on the one or more of the first plurality of database pages while the database instance is executing.

4. The method according to claim 1, further comprising:
   deleting the cache converter from the cache memory in response to completion of the database task.

5. A non-transitory computer-readable medium storing program code, the program code executable by a computer to:
   receive, at an executing database instance, a request for access to a first plurality of database pages associated with a previous state of the database instance and not represented by a current converter of the executing database instance, the current converter mapping a logical page number of each database page associated with a current state of the executing database instance to a corresponding physical storage location, the first plurality of database pages including a first converter mapping a logical page number of each of the first plurality of database pages to a corresponding physical storage location, and the logical page numbers of the first plurality of database pages and at least one of the logical page numbers of the database pages associated with the current state of the executing database instance being the same;
   generate a cache converter in a cache memory of the executing database instance based on the first converter, the cache converter mapping a modified logical page number of each of the first plurality of database pages to a corresponding physical storage location of the database page, the modified logical page number of each of the first plurality of database pages identifying the previous state of the database instance and the logical page number of the database page;
   identify a file identifier associated with each logical page number of each of the first plurality of database pages;
   map a modified file identifier of each of the first plurality of database pages to the modified logical page number of the database page, the modified file identifier identifying the previous state of the database instance and the file identifier associated with the logical page number of the database page;
   generate an entry of a database catalog to associate with each modified file identifier, the generated entry being based on an existing entry of the database catalog associated with the file identifier identified by the modified file identifier; and
   perform a database task using the mapping of modified file identifiers to modified logical page numbers and the one or more of the first plurality of database pages while the database instance is executing.

6. The non-transitory computer-readable medium according to claim 5, the program code further executable by a computer to:
   identify the first converter within the plurality of pages based on a snapshot restart record of the executing database instance.

7. The non-transitory computer-readable medium according to claim 5, wherein performance of the database task comprises performance of a data integrity check based on the one or more of the first plurality of database pages while the database instance is executing.

8. A system comprising:
a memory;
a processor; and
an executing database instance comprising:
a first plurality of database pages associated with a previous state of the database instance;
a cache storing a current converter of the executing database instance, the current converter not representing the first plurality of database pages, the current converter mapping a logical page number of each database page associated with a current state of the executing database instance to a corresponding physical storage location, the first plurality of database pages including a first converter mapping a logical page number of each of the first plurality of database pages to a corresponding physical storage location, and the logical page numbers of the first plurality of database pages and at least one of the logical page numbers of the database pages associated with the current state of the executing database instance being the same; and
a database management system to:
receive a request for access to the first plurality of database pages, the first plurality of database pages including a first converter mapping a logical page number of each of the first plurality of database pages to a corresponding physical storage location;
generate a cache converter in the cache of the executing database instance based on the first converter, the cache converter mapping a modified logical page number of each of the first plurality of database pages to a corresponding physical storage location of the database page, the modified logical page number of each of the first plurality of database pages identifying the previous state of the database instance and the logical page number of the database page;
identify a file identifier associated with each logical page number of each of the first plurality of database pages;
map a modified file identifier of each of the first plurality of database pages to the modified logical page number of the database page, the modified file identifier identifying the previous state of the database instance and the file identifier associated with the logical page number of the database page;
generate an entry of a database catalog to associate with each modified file identifier, the generated entry being based on an existing entry of the database catalog associated with the file identifier identified by the modified file identifier; and
perform a database task using the mapping of modified file identifiers to modified logical page numbers and the one or more of the first plurality of database pages while the database instance is executing.

9. The system according to claim 8, the database management system further to:
identify the first converter within the plurality of pages based on a snapshot restart record of the executing database instance.

10. The system according to claim 8, wherein performance of the database task comprises performing a data integrity check based on the one or more of the first plurality of database pages while the database instance is executing.

11. The system according to claim 8, the database management system further to:
delete the cache converter from the cache in response to completion of the database task.

* * * * *